United States Patent [19]
Kroening et al.

[11] 4,244,532

[45] Jan. 13, 1981

[54] CRUSHER SWING JAW

[75] Inventors: Gerald E. Kroening, Columbia; Karl B. Werginz, W. Columbia, both of S.C.

[73] Assignee: Litton Systems, Inc., Columbia, S.C.

[21] Appl. No.: 932,866

[22] Filed: Aug. 11, 1978

Related U.S. Application Data

[63] Continuation of Ser. No. 819,662, Jul. 28, 1977, abandoned.

[51] Int. Cl.³ .......................... B02C 1/10; B23K 31/02

[52] U.S. Cl. .................................... 241/264; 228/165; 228/182; 241/285 R

[58] Field of Search ................................ 241/262-268, 241/291, 300, 269, 285 R; 228/165, 178, 182

[56] References Cited

U.S. PATENT DOCUMENTS

| | | | |
|---|---|---|---|
| 1,358,682 | 11/1920 | Rennerfelt | 241/268 |
| 2,003,138 | 5/1935 | Fries | 228/182 |
| 2,084,188 | 6/1937 | Buchanan | 241/269 X |
| 2,155,393 | 4/1939 | Battey | 241/285 A |
| 2,345,918 | 4/1944 | Dahlstrand | 228/165 X |
| 2,441,205 | 5/1948 | Peterson | 241/300 |
| 2,931,585 | 4/1960 | Butler | 241/269 X |
| 3,503,563 | 3/1970 | Daly | 241/285 R X |
| 3,804,345 | 4/1974 | De Diemar | 241/291 X |
| 3,843,068 | 10/1974 | Allen et al. | 241/285 R |
| 3,966,130 | 6/1976 | Doty | 241/285 R |

*Primary Examiner*—Kenneth J. Ramsey
*Attorney, Agent, or Firm*—Morris I. Pollack

[57] ABSTRACT

Plates, of steel or other suitable material and which are appropriately sized, are welded together to form a fabricated swing jaw body for a jaw type crusher. The barrel, disposed proximate the upper extremity of the swing jaw body and which houses the bearings and shaft that operate the swing jaw, is formed either: from a continuous plate rolled into a cylinder of proper size and welded into the swing jaw body; from a number of plates welded to each other and to the swing jaw body to form therewith a cylinder like enclosure for said bearings and shaft; or from a number of plates with openings formed therethrough and stacked and welded one against the other and to said swing jaw body to form said enclosure. A piece of non-rectangular bar stock is secured proximate the bottom of the swing jaw body and has formed therein a seat for the toggle plate mechanism of the crusher jaw. Various cross bracings are welded within, outside, or within and outside said steel plates to secure and strengthen same; while a backing plate or backing strips are also welded thereto to provide additional strength and securing means.

36 Claims, 12 Drawing Figures

CRUSHER SWING JAW

This is a continuation of application Ser. No. 819,662, filed July 28, 1977, now abandoned.

BACKGROUND OF THE INVENTION

1. Field of Application

This invention relates to crusher jaws and more particularly to the swing jaw of a jaw type crusher.

2. Description of Prior Art

After rock, ore, and similar materials have been mined the pieces thereof are usually of mixed sizes, some of which might be extremely large. As such these materials are usually processed through suitable crushing equipment to reduce their size to one which can be more conveniently transported and/or to a size which is best suited for further processing toward the intended end use. One well known type of crusher is a jaw type crusher. In this equipment the material to be crushed is desposited between a pair of jaw members; one of which moves towards and away from the other. The jaws are mounted so that the spacing between them is greater at the material entrance and narrows towards the opening where the crushed material exits the crusher. Thus the movement of the movable jaw acts upon material lodged between the jaws to break up the material and reduce its size. As the size is thus reduced the material drops further down into the narrowing space between the jaws, until it exits the crusher at the intended size.

Commercially available jaw type crushers such as those shown in U.S. Pat. Nos. 1,608,561 and 3,804,345 cast the movable or swing jaw from suitable materials. However, casting requires a considerable investment in plant and labor if the crusher manufacturer desires to control his own supply of crusher jaws. If his output is too small to fully utilize the casting plant the operation becomes quite inefficient and costly. Quality control also presents considerable problems.

The cost of plant and labor (and hopefully of the jaws) may be reduced by relying upon vendors who operate casting plants to supply the swing jaw. Here again, quality control becomes a problem. In addition, depending upon the demands of the marketplace, obtaining castings, with reasonable lead times, has sometimes presented considerable problems. Also shipping of such casting adds to the cost thereof and at times presents serious complications especially for the larger swing jaws.

Some attempts have been made to alleviate these problems by fabricating the part of the swing jaw below the barrel which houses the bearings and shaft. In such equipment, however, the barrel with attendant support structures are still cast and the welding thereof to the remainder of the swing jaw body is accomplished along a plane through the assembly.

Most swing jaws have mounted proximate their lower extremities a toggle seat for co-operation with a toggle mechanism utilized to adjust the position of the lower end of the swing jaw with respect to the lower end of its opposing jaw. This controls the size of the spacing between the jaws, the exit opening and the material being crushed. Generally as shown in equipment such as that shown in the previously mentioned U.S. Pat. Nos. 1,608,561 and 3,804,345 a space must be machined into the casting to accept the toggle seat. Alternatively, as shown in U.S. Pat. No. 2,453,596, a rectangular bar is secured to the casting to receive the seat. There is extreme loading at the toggle seat area; and the stresses so created tend to concentrate and induce failure at the sharp corners of such prior art constructions.

SUMMARY OF THE INVENTION

It is therefore an object of this invention to provide a new and improved crusher swing jaw.

It is a further object to provide a new and improved fabricated crusher swing jaw.

Another object is to provide a new and improved method of forming a crusher swing jaw.

Still another object is to provide a new and improved crusher swing jaw substantially fabricated from plates.

Yet still another object is to provide a new and improved crusher swing jaw fabricated from plates but with a rolled barrel.

A still further object is to provide a new and improved crusher swing jaw wherein the jaw body and the barrel are fabricated entirely from plate material.

Yet a still further object is to provide a new and improved crusher swing jaw having a toggle bearing seat fabricated from bar stock of non-rectangular cross-section.

This invention involves the manufacture of the swing jaw member of a jaw type crusher; and contemplates the fabrication thereof from plate steel, or other suitable material, secured together as by welding to form the main body of the swing jaw for attachment to a barrel that is either rolled from a single plate, fabricated from multiple plates, forged or cast. It further contemplates the fabrication into such swing jaw of a toggle seat support formed from bar stock of non-rectangular configuration.

Other objects, features, and advantages of the invention in its details of construction and arrangement of parts will be seen from the above, from the following description of the preferred embodiment when considered with the drawings and from the appended claims.

DESCRIPTION OF THE PREFERRED EMBODIMENT

For convenience, the invention will be described as applied to the swing jaw of a jaw type crusher fabricated from relatively heavy steel plates welded together to form the swing jaw body and having welded thereto a barrel formed either from a rolled steel plate, from a plurality of steel plates welded into a barrel-like configuration, or from a plurality of stacked apertured steel plates, and also having welded thereto a toggle seat member formed from a bar of stock of circular cross-section; it being understood, nevertheless, that without departing from the scope of this invention that other suitable materials may be used, that the plates may be secured together by any suitable and appropriate means, that the toggle seat member may be of any convenient but non-rectangular cross-section, and that the barrel may be forged or cast.

Figure 1:
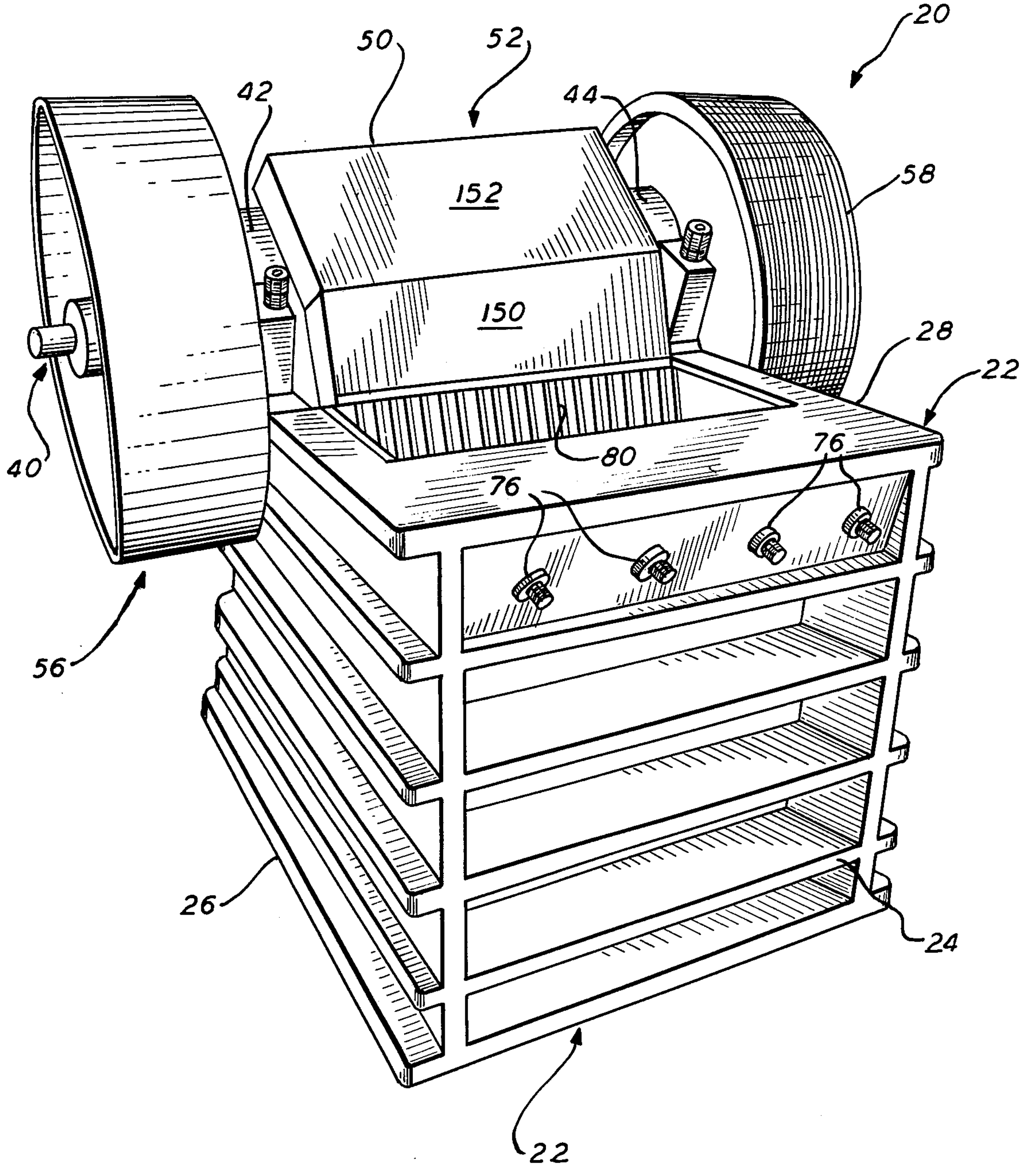
FIG. 1 is a front perspective showing of a jaw type crusher incorporating the instant invention.

With reference to FIG. 1, there is generally shown at 20 a jaw type crusher including a frame 22 having a front wall 24, a pair of opposed and spaced side walls 26, 28 and a rear wall 30 (FIG. 2) all interconnected into a box-like structure generally open at its top 32 and bottom 34.

A main shaft 40 is disposed for rotation in a conventional manner in a plurality of bearings 41 (FIG. 2) in suitable housings 42, 44 (FIG. 1) disposed atop walls 26, 28 respectively. Additional bearings (not shown) further support shaft 40 within a barrel portion 50 of a swing jaw 52 and serve to mount swing jaw 52 for its conventional reciprocating motion. This reciprocating motion is accomplished because the portion of shaft 50 within barrel 52 is eccentric in crosssectional configuration, as is common for such shafts.

A flywheel 56 (FIG. 1) is secured to one end of shaft 40; while a grooved flywheel or pulley 58 is secured to the other end of shaft 40. Suitable drive means (not shown), such as a gasoline or diesel engine, are provided for crusher 20 with appropriate drive transmission means (not shown) connecting same to pulley 58 to rotate same and shaft 40 to thereby operate swing jaw 52.

The inside wall 70 of front wall 24 acts as the stationary jaw for crusher 20 coacting with swing jaw 52 in a substantially conventional manner. A stationary wear member 72, of manganese or other suitable material, is secured to wall 70 by being supported upon a shoulder 74 formed at the base thereof and by coaction with a threaded securing means 76 which passes through front wall 24.

Figures 2A, 4:
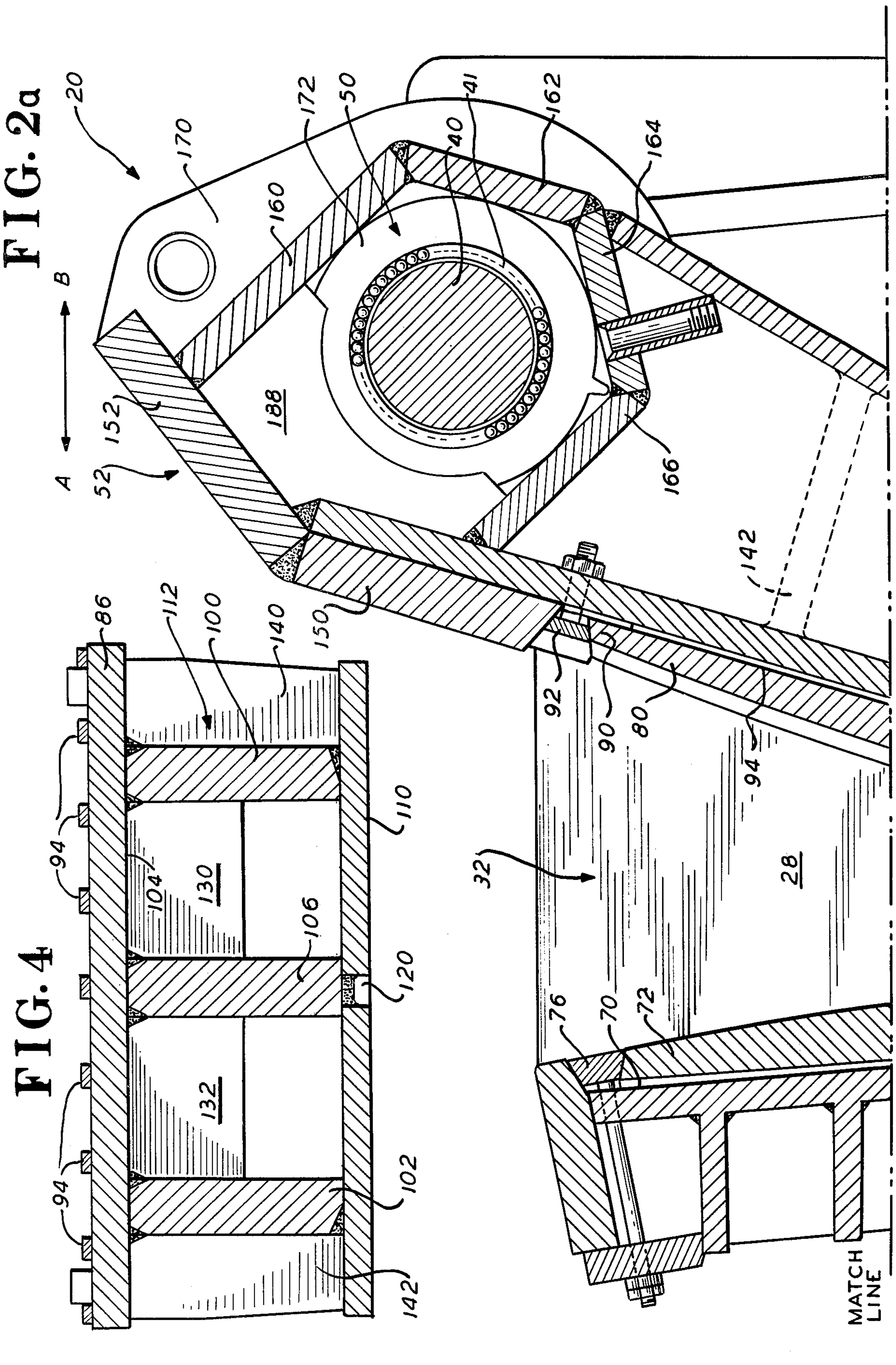
FIGS. 2*a* and 2*b* is a vertical section showing a fabricated swing jaw with a fabricated barrel installed in the crusher of FIG. 1; and are to be joined together along the indicated "match line" to form a composite figure.
FIG. 4 is a sectional view taken on line 4—4 of FIG. 3.
Figure 2B:
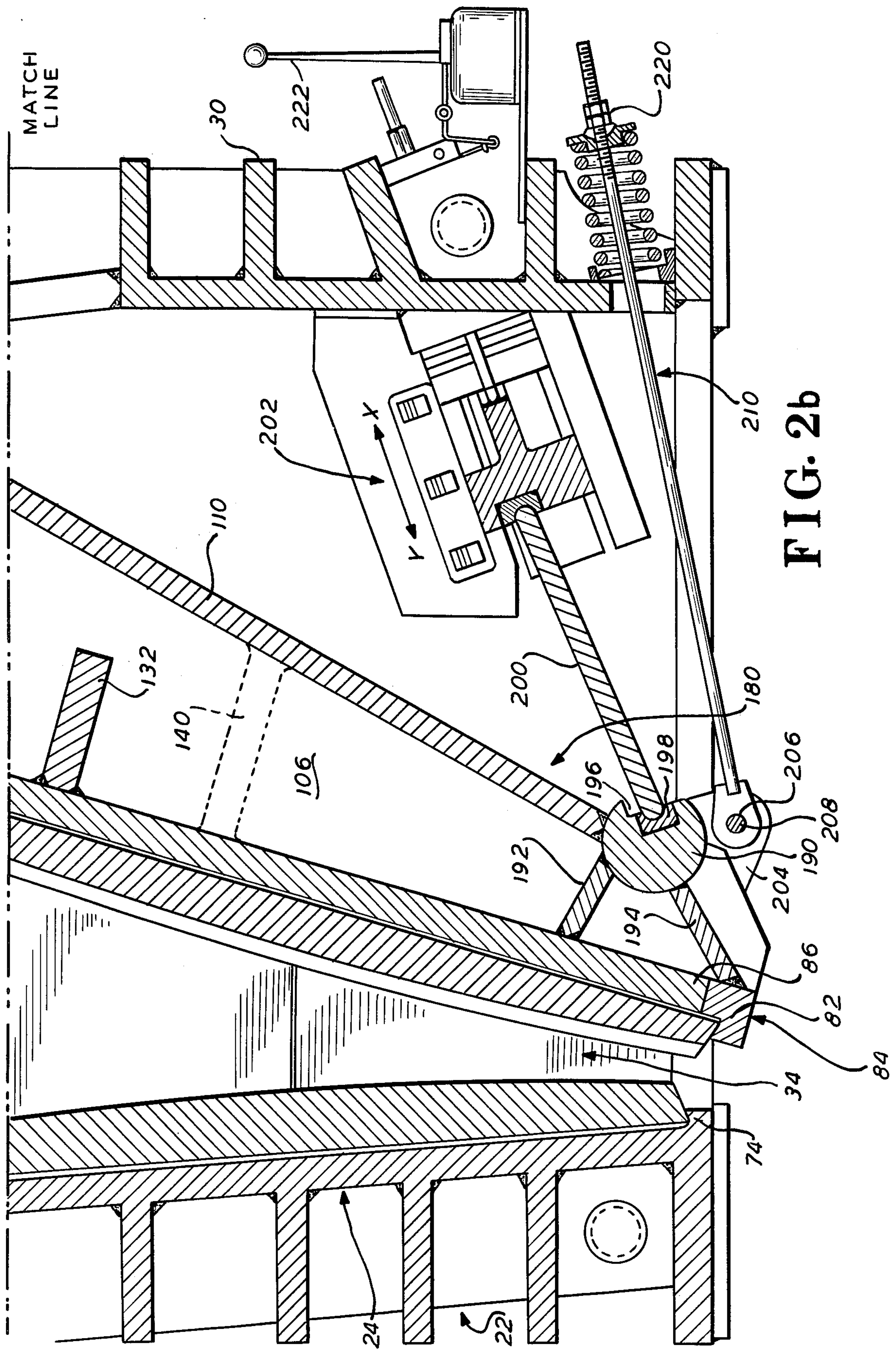
Figure 3:
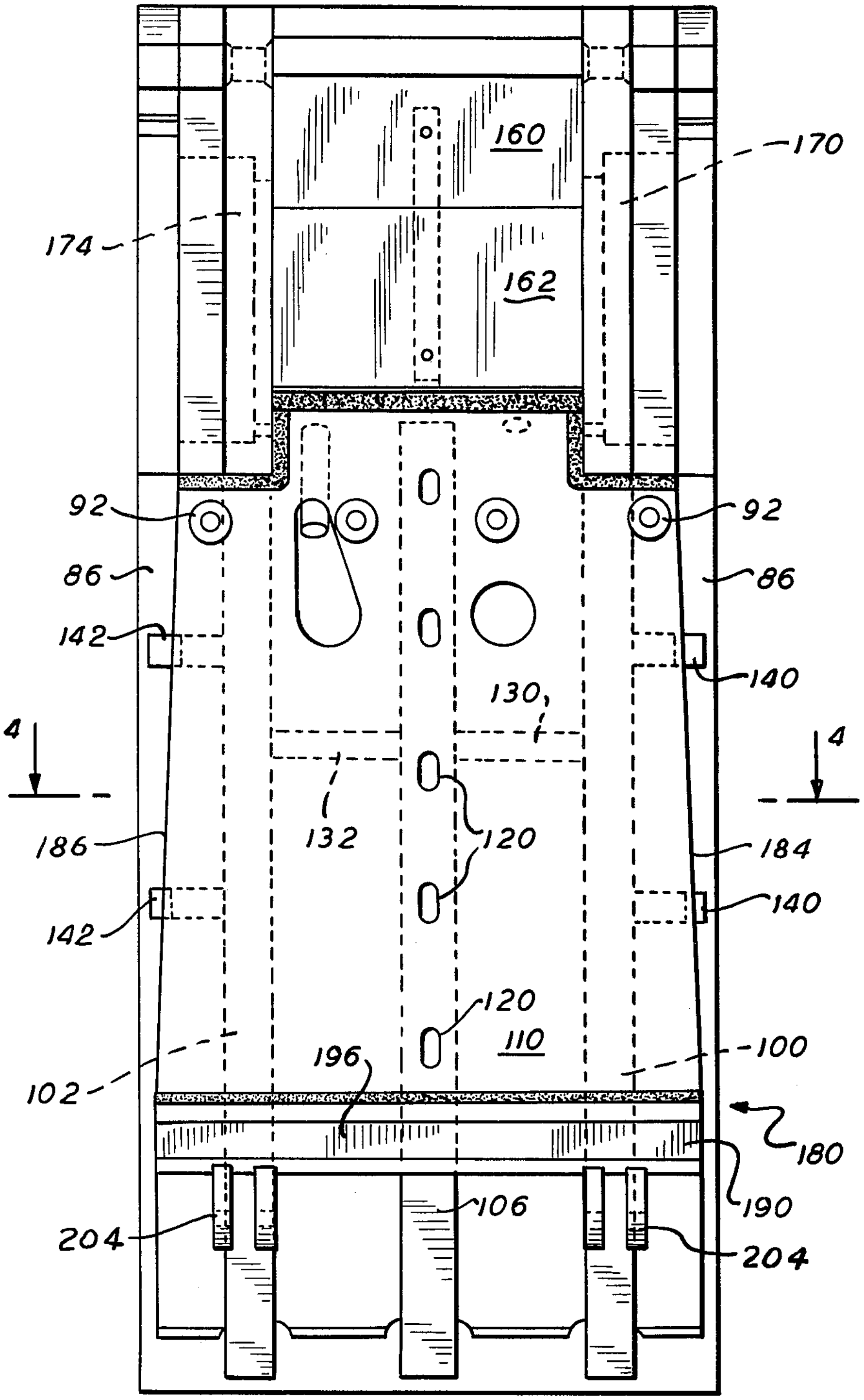
FIG. 3 is a view of the back (the side opposite the crushing face) of the swing jaw of FIG. 2.

A movable wear member 80 (FIGS. 1 and 2) is disposed upon swing jaw 52 and so as to be in opposed relationship with stationary wear member 72 to act in conjunction therewith and crush therebetween rocks deposited into opening 32 of crusher 20. Movable wear member 80 rests upon a shoulder 82 formed proximate a bottom edge 84 of a front or crushing face plate 86 of swing jaw 52. An upper edge 90 is secured in place against face plate 86 by threaded securing means 92 (FIGS. 2 and 3). A number of ribs 94 (FIG. 4) are formed on the crushing side of face plate 86 to further support movable wear member 80 (FIG. 2).

A right side main rib 100 (FIGS. 3 and 4) and a left side main rib 102 are welded to and extend back from a rear surface 104 of face plate 86; and, along with a central main rib 106, also welded to and extending back from face panel 86, serve to strengthen and support face plate 86. A backing plate 110 (FIGS. 3 and 4) is also welded to right side main rib 100, left side main rib 102 and central main rib 106 and forms therewith and with face plate 86 a box-like main structural body 112 for fabricated swing jaw 52. A plurality of apertures 120 (FIGS. 3 and 4) are formed through backing plate 110 to facilitate welding of backing plate 110 to central main rib 106; such welding being accomplished by welding the sides of apertures 120 to the exposed surface of central main rib 106.

A plurality of internal cross-bracing members 130 and 132 are respectively welded in place between main ribs 100 and 106 and 102 and 106 to further strenghen structural body 112; while a plurality of external cross-bracing members 140 and 142 are respectively welded in place between face plate 86, backing plate 110, and main rib 100, and face plate 86, backing plate 110 and main rib 102 to add additional support and strength for swing jaw body 52.

A lower impact plate 150 is secured, as by welding, proximate the top of face plate 86 and below an upper impact plate 152 secured, as by welding, at the upper extremity of jaw body 52. Plates 150 and 152 are of very heavy stock so that when swing jaw body 52 is disposed in frame 22 impact plates 150 and 152 are positioned to receive the impact of rocks dropping into crusher 20 and to protect barrel 50 and shaft 40 and bearings 41 therein. A plurality of barrel plates 160, 162, 164, and 166 (FIG. 2) are welded to each other; with barrel plate 160 also welded to the rear surface of impact plate 152 and barrel plate 166 also welded to the rear surface of face plate 86 proximate the upper extremity thereof. Barrel plates 160, 162, 164 and 166 thus co-operate with impact plate 152 and face plate 86 to form therewith the enclosure which constitutes barrel 50.

Right side rib 100 extends the full length of swing jaw body 52 (FIGS. 2 and 3) and is formed with an upper portion 170 disposed to the side of barrel 50. An aperture 172 of appropriate size is formed in upper portion 170 in alignment with barrel 50. Left side main rib 102 extends the full length of swing jaw body 52 (FIG. 3) and is formed with an upper portion 174 disposed to the other side of barrel 50. An aperture (not shown) of appropriate size is formed in upper portion 172 in alignment with barrel 50. Right side main rib 100 and left side main rib 102 are also welded to their respective side extremities of barrel 50 and as such further strengthen same and swing jaw body 52. The upper extremity of central main rib 106 is welded to plates 164 and 166 of barrel 50. It should be further noted that the upper extremity of backing plate 110 is welded to barrel plate 164, and that backing plate 110 extends therefrom to terminate proximate a lower extremity 180 (FIGS. 2 and 3) of swing jaw 52. Side edges 184, 186 of backing plate 110 taper outwardly from the upper extremity of backing plate 110 to the lower extremity thereof as is clearly shown in FIG. 3. This adds additional strength to swing jaw body 52. Further strength is provided by the use of support plates 188 disposed within barrel 50.

A toggle plate bar 190 is welded proximate lower extremity 180 of swing jaw body 52 to the lower extremity of backing plate 110 and to the number of support bars 192, 194 (FIG. 2) disposed at that location. A groove 196 is machined into bar 190 to receive a seat 198 for toggle plate 200 of a toggle assembly 202 of substantially conventional construction. Also disposed proximate lower extremity 180 of swing jaw body 52 are bottom plates 204 having apertures 206 formed therethrough to receive a pin 208 of a tension rod assembly 210 also of substantially conventional construction.

It should be noted that bar 190 is circular in crosssection and that this greatly facilitates welding same into position at lower extremity 180 of jaw body 52. If a bar of rectangular cross section were to be used welding same into place would be more difficult and the straight sides and corners create areas of dangerous stress concentrations. While a bar of circular cross section has been selected for this embodiment it should be understood that bars of other non-rectangular cross section (such as hexagonal) would also serve the purpose and facilitate welding at this position.

Swing jaw body 52 is thus substantially formed from plate stock; each plate having a thickness and size depending upon the overall dimensions of crusher 20. The plates and other components of jaw body 52 are welded together, some by slag type welding process, or are otherwise secured together to form a highly strengthened unit having many characteristics more favorable then units formed as castings of with substantial cast elements.

When swing jaw body 52 is disposed in crusher 20 bearings 41 and shaft 40 may be properly positioned to mount the upper extremity of swing jaw body 52 for reciprocatory movement in the directions of arrows A and B of FIG. 2. This is effected by providing a conventional drive for main shaft 40 and due to the eccentricity of said shaft 40. When so reciprocating swing jaw body 52 pivots about toggle plate 200, in conventional manner, with tension rod assembly 210 maintaining the pivoting relationship at toggle assembly 202. If it is desired to adjust the size of product leaving opening 34 one need only loosen nut 220 of tension rod assembly 210 and operate toggle adjustment assembly 202 by the use of control lever 222 thereof. This will effect movement of toggle plate 200 in either the direction of arrow X (FIG. 2) (to enlarge opening 34) or in the direction of arrow Y to close same. After opening 34 has been set to the desired size nut 220 is again tightened to secure the setting.

Figure 5:
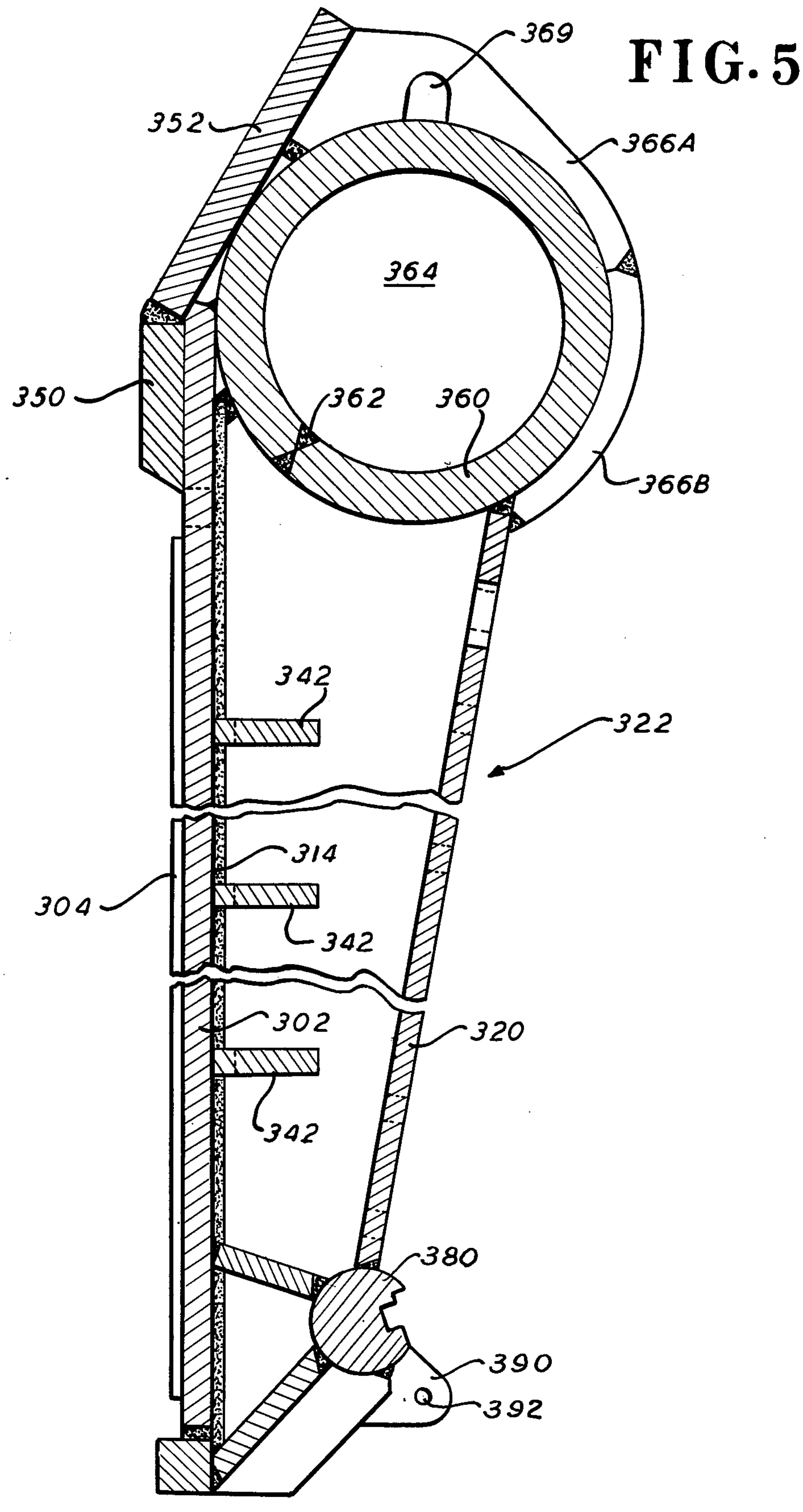
FIG. 5 is a sectional view, broken away, of a modified fabricated swing jaw and showing a rolled barrel incorporated therein and a modified system of cross-bracing.
Figure 6:
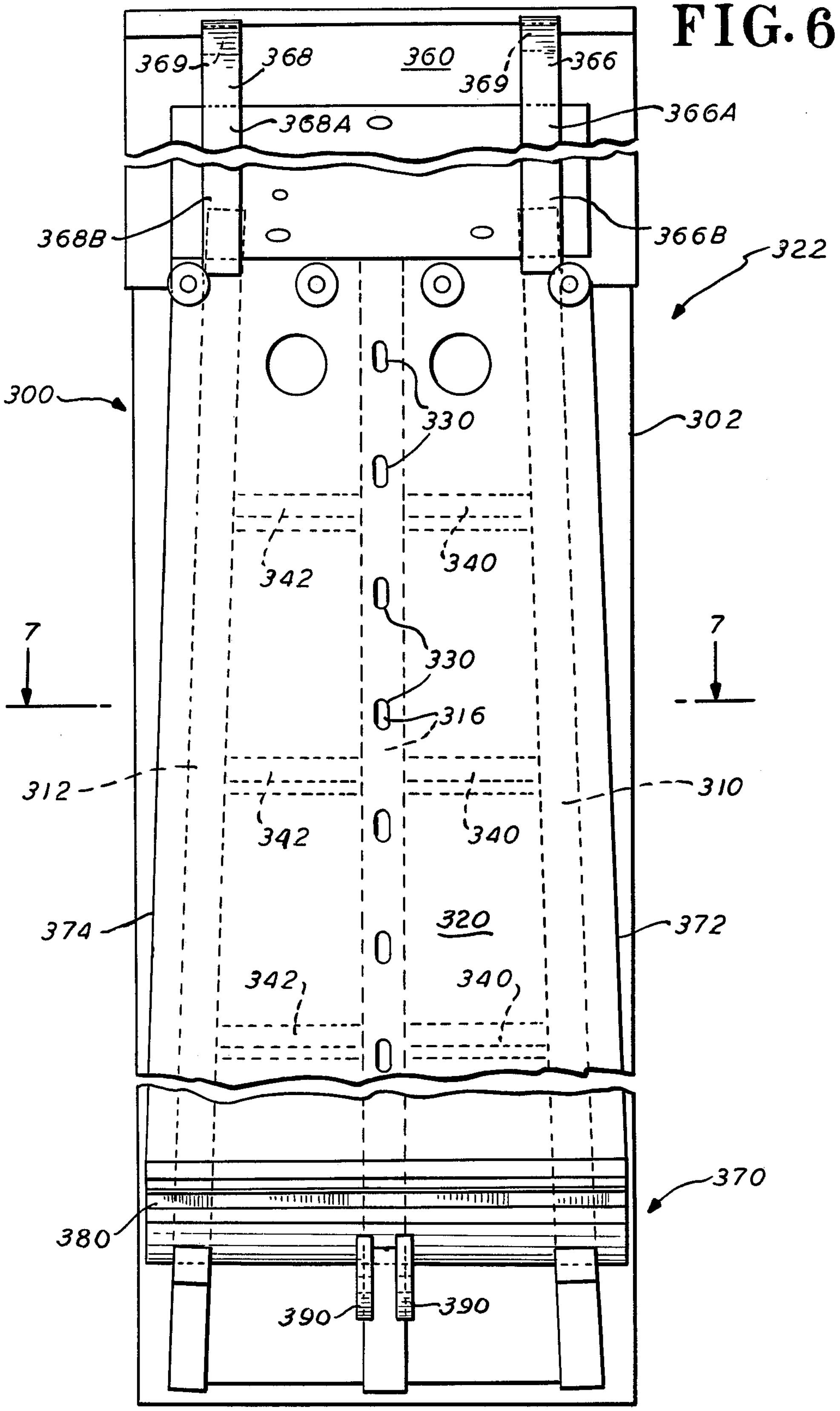
FIG. 6 is a view of the back (the side opposite the crushing face) of the swing jaw of FIG. 5.
Figure 7:
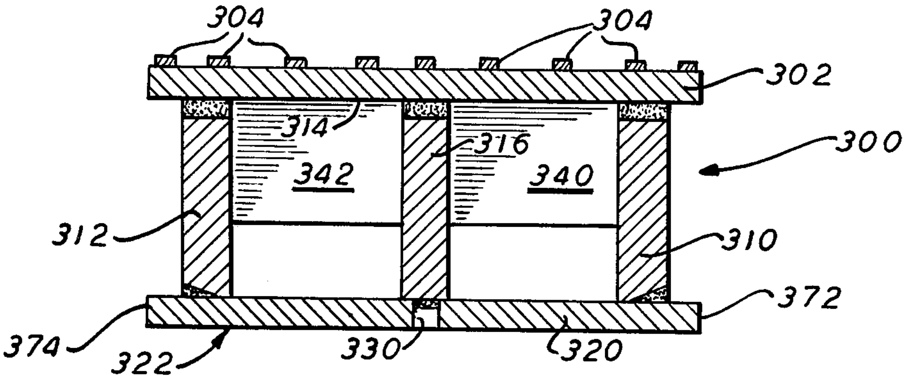
FIG. 7 is a sectional view taken on line 7—7 of FIG. 6.

In the embodiment of FIGS. 5, 6 and 7, there is shown a swing jaw 300 that may be substituted for swing jaw 52 of the embodiment of FIGS. 1–4. When so substituted swing jaw 300 functions in the same manner as swing jaw 52.

Swing jaw 300 includes a front crushing face plate 302 with a plurality of ribs 304 secured to the crushing side thereof in spaced relationship one to the other for the purpose of assisting in the support and positioning on plate 302 of a movable wear member (not shown) similar in configuration to wear member 80 of swing jaw 52, and otherwise secured to plate 302 in a manner similar to that which wear member 80 is secured to swing jaw 52.

A right side main rib 310 (FIGS. 6 and 7) and a left side main rib 312 are welded to and extend back from a rear surface 314 of face plate 302; and, along with a central main rib 316 also welded to and extending back from face plate 302, serve to strengthen and support face plate 302. A backing plate 320 is also welded to right side main rib 310, left side main rib 312 and central main rib 316 and form therewith, and with face plate 302 a box-like main structural body 322 for fabricated swing jaw 300. A plurality of apertures 330 (FIGS. 6 and 7) are formed through backing plate 320 to facilitate welding of backing plate 320 to central main rib 316; such welding being accomplished by welding the sides of apertures 330 to the exposed surface of central main rib 316.

A plurality of internal cross-bracing members 340 and 342 are respectively welded in place between main ribs 310 and 316 and 312 and 316 to further strengthen structural body 322.

A lower impact plate 350 is secured, as by welding, proximate the top of face plate 302 and below an upper impact plate 352 secured, as by welding, at the upper extremity of jaw body 300. Plates 350 and 352 are of very heavy stock so that when swing jaw body 300 is disposed in a frame, such as frame 22, impact plates 350 and 352 are positioned to received the impact of rocks dropping into crusher 20 and to protect a barrel 360 and the shaft (not shown) and bearings (not shown) housed therein and which facilitate the reciprocating action of swing jaw 300 in a manner similar to that of swing jaw 52.

Barrel 360 is preferably rolled from plate steel of appropriate thickness; with the seam 362 welded to form a cylindrical barrel having opening 364 of proper diameter for the shaft and bearings. Barrel 360 may also be forged or cast. A pair of barrel supports 366, 368, also formed of plate steel are each formed of two rib sections 366A, 366B and 368A, 368B respectively. Ribs 366B, 368B are curved to lie against the outer wall of barrel 360 and are welded thereagainst and in alignment with the upper extremities of right side main rib 310 and left side main rib 312 respectively. To the extent that ribs 366B and 368B lie proximate the upper extremity of backing plate 310 they may also be welded thereto. Ribs 366A and 368A are also shaped to fit against the outer surface of barrel 360 and are sized to extend from ribs 366B and 368B into engagement with the rear surface of impactor plate 352. Ribs 366A and 368A are secured to ribs 366B, 368B, outer surface of barrel 360 and the rear surface of impactor plate 352 by welding or the like. If desired apertures 369 may be formed through ribs 366A, 368A proximate the upper ends thereof to serve as lifting ends to facilitate lifting swing jaw 300 when installing same into, and removing same from, the crusher.

It should be noted that right side main rib 310 and left side main rib 318 spread or flare outwardly and downwardly towards the lower extremity 370 of swing jaw 300 from where they are secured to end plates 366 and 368 proximate the upper area of swing jaw 300. In similar manner the side edges 372, 374 of backing plate 320 also spread or taper outwardly from proximate barrel 360 at the upper area of swing jaw 300 to the end of backing plate 320 proximate lower area 370 of swing jaw 300. The added width of backing plate 320 and the associated spread of right side main rib 310 and left side main rib 312 at lower area 370 serve to provide a strengthened support for a toggle plate bar 380 similar in configuration and purpose to toggle plate bar 190 of the embodiment of FIGS. 1–4. A single set of bottom plates 390 having apertures 392 facilitate interconnection of swing jaw 300 to a tension rod assembly (not shown) in a manner and for a purpose similar to that described for tension rod assembly 210 of the embodiment of FIGS. 1–4.

Swing jaw 300 is positioned and secured into a crusher (like crusher 20) like swing jaw 52; and when so disposed functions like swing jaw 52.

Figure 9:
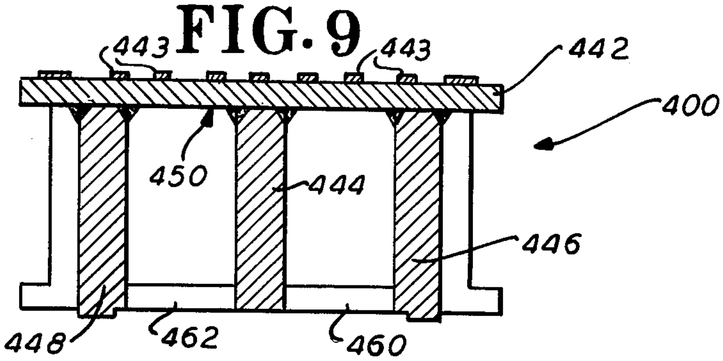
FIG. 9 is a sectional view taken on line 9—9 of FIG. 8.
Figure 8:
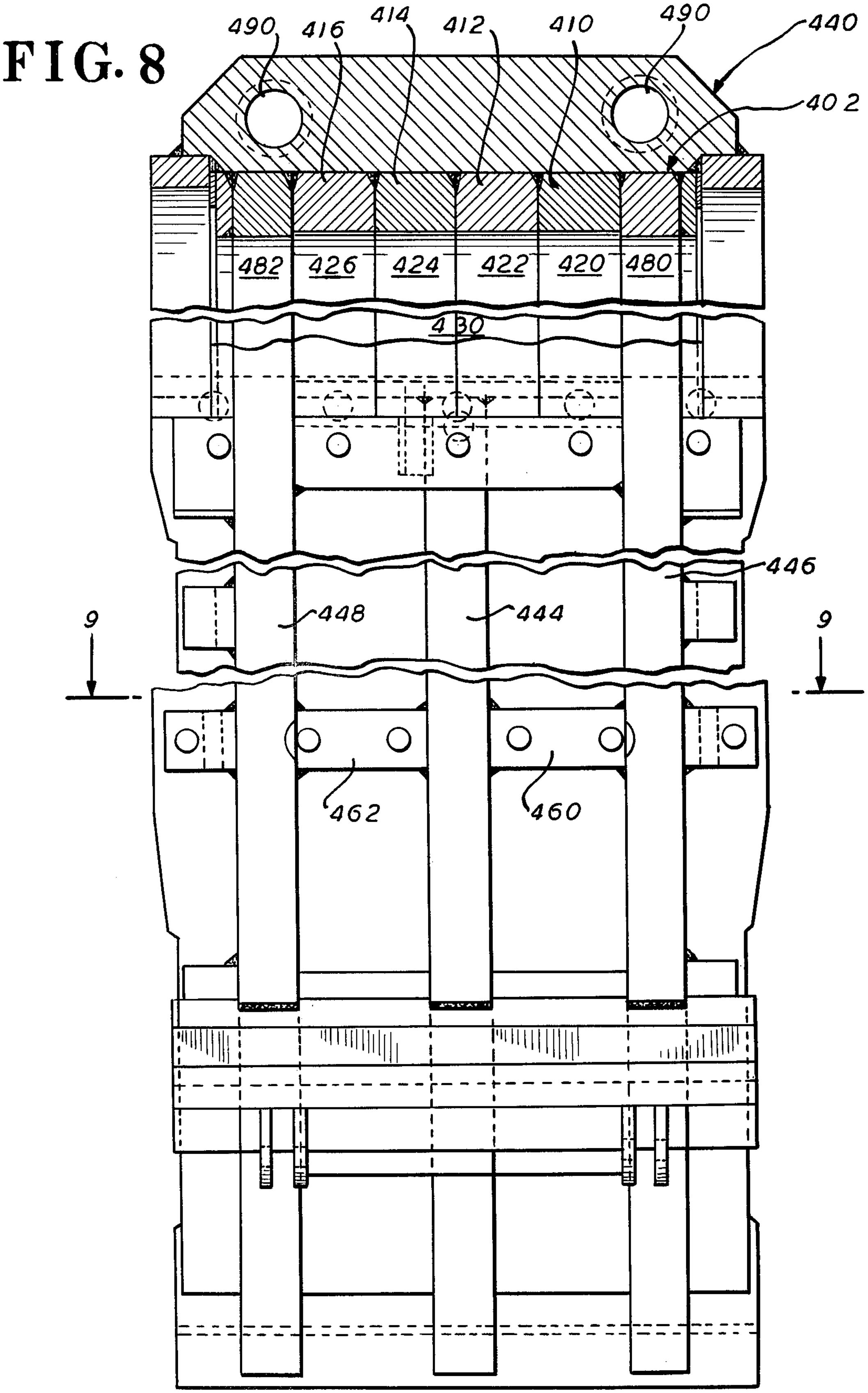
FIG. 8 is a view of the back of yet another modified fabricated swing jaw formed with a barrel fabricated from apertured plates and incorporating still another form of cross-bracing.

A further alternative construction for a fabricated swing jaw 400 is shown in FIGS. 8 and 9. In this embodiment the barrel 402 (which houses the shaft and bearings) is formed from a stack of relatively thick ring like steel plates 410, 412, 414, and 416 each having an aperture 420, 422, 424 and 426 respectively cut therethrough so that when plates 410, 412, 414 and 416 are stacked said apertures are aligned to form a cylindrical opening 430 for the shaft and bearings. Plates 410, 412, 414 and 416 are secured together into said stack by welding or other suitable means.

Barrel 402 is secured to an impactor plate 440 and to a front or crusher face plate 442 by welding and in a manner similar to that described for the previous embodiments. Plate 442, carries a plurality of spaced ribs 443 which facilitate mounting of the movable wear member (not shown) that is otherwise secured in place as described earlier for wear member 80 of jaw 52. A central main rib 444, a right side main rib 446, and a left side main rib 448 are all welded to the rear surface 450 of plate 442 and extend back therefrom. A plurality of cross ribs 460, 462 are welded in place between right side main rib 446 and central main rib 444 and between left side main rib 448 and central main rib 444 respectively to further strengthen jaw 400.

It should be noted that right side main rib 446 and left side main rib 448 extend up proximate plates 410 and 416 respectively of barrel 402 to complete barrel 402. As such apertures 480 and 482 are cut through ribs 446 and 448 respectively in alignment with opening 430 to complete same to a size to accommodate the shaft and bearings. The inclusion of full length ribs 446, 448, into the stack forming barrel 402 adds great strength thereto. If desired lifting eyes 490, may be disposed proximate the upper extremity of swing jaw 400 to facilitate insertion thereof and removal therefrom from a crusher.

Once installed swing jaw 400 functions in a manner as hereinbefore described for the swing jaw of the other embodiments.

Figure 10:
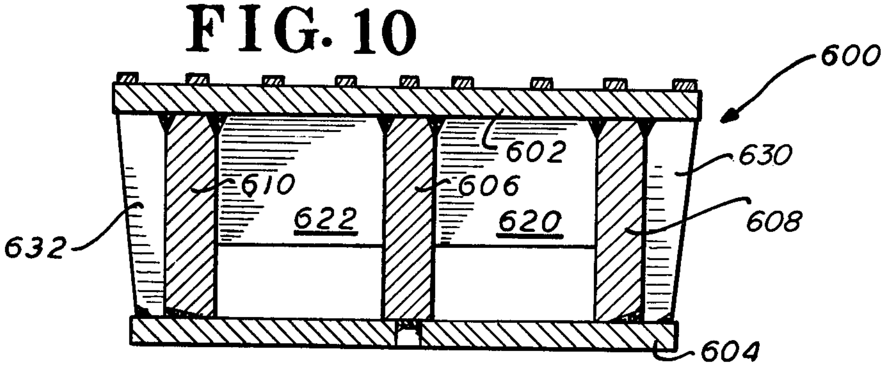
FIG. 10 is a sectional view similar to that of FIG. 9 but showing an alternative form of cross-bracing.

In FIG. 10 the swing jaw fabrication 600 is shown with a front plate 602, a backing plate 604 interconnected by a central main rib 606, a right side main rib 608 and a left side main rib 610; all welded together to form a unitary structure as described for the swing jaws hereinabove described. Swing jaw 600 includes inside cross ribs 620, 622 and outside cross ribs 630, 632, all welded in place at selected locations for added strength.

Figure 11:
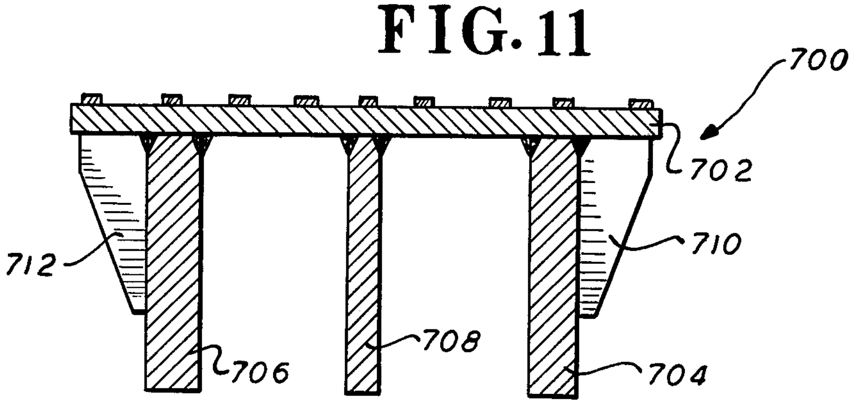
FIG. 11 is yet another view similar to that of FIGS. 9 and 10 and showing still another form of cross-bracing.

In FIG. 11 there is shown a swing jaw 700 with a front plate 702 having a right side main rib 704 and a left side main rib 706 welded to the rear face thereof and extending backwardly therefrom. A central main rib 708 is also welded to the rear face of plate 702 and extends back therefrom. It should be noted that central main rib 708 is not as thick as right side main rib 704 and left side main rib 706 which are of equal thickness. A number of cross ribs 710, 712 are welded outside of ribs 704 and 706 and to the rear surface of plate 702 in selected places to further strengthen jaw 700.

We claim:

1. A composite swing jaw for a crusher; comprising:

(a) a first plate member having an upper area and a lower area with a face surface and a rear surface extending therebetween;

(b) a plurality of main rib members positioned and disposed to extend outwardly from said rear surface of said first plate member and sized to extend between an upper location proximate said upper area and a lower location proximate said lower area;

(c) barrel means, formed from a plurality of plate members secured together and to said first plate member to form with said first plate member a barrel like enclosure with an opening through which the shaft for operating the swing jaw passes, having an outer peripheral surface disposed in proximity to said first plate member proximate said upper area thereof and to said main rib members proximate said upper location; and (d) securing means rigidly interconnecting said first plate member, said plurality of main rib members, and said barrel means into a composite whole.

2. A composite swing jaw for a crusher; comprising:

(a) a first plate member having an upper area and a lower area with a face surface and a rear surface extending therebetween;

(b) a plurality of main rib members positioned and disposed to extend outwardly from said rear surface of said first plate member and sized to extend between an upper location proximate said upper area and a lower location proximate said lower area;

(c) barrel means, formed from a plurality of ring-like members concentrically disposed and secured one adjacent to the other to form an opening through which the shaft for operating the swing jaw passes, having an outer peripheral surface disposed in proximity to said first plate member proximate said upper area thereof and to said main rib members proximate said upper location; and (d) securing means rigidly interconnecting said first plate member, said plurality of main rib members, and said barrel means into a composite whole.

3. The method of forming a crusher swing jaw; comprising:

(a) forming a first plate member with an upper area and a lower area and with a face surface and a rear surface extending therebetween, and with a pair of side edges;

(b) forming a plurality of rib members from plate like material and sized to correspond to the distance between said upper and lower areas;

(c) positioning said plurality of rib like members so that each one extends outwardly from said rear surface and between said upper and said lower areas;

(d) forming barrel means from a plurality of plate members welded together into a barrel-like configuration to receive the shaft for operating the swing jaw, and with an outer peripheral surface disposed proximate said first plate member proximate said upper area thereof and disposed proximate at least some of said rib member proximate an upper location thereof; and (e) securing said first plate member, said plurality of rib members, and said barrel member together to form the swing jaw.

4. The method of forming a crusher swing jaw; comprising:

(a) forming a first plate member with an upper area and a lower area and with a face surface and a rear surface extending therebetween, and with a pair of side edges;

(b) forming a plurality of rib members from plate like material and sized to correspond to the distance between said upper and lower areas;

(c) positioning said plurality of rib like members so that each one extends outwardly from said rear surface and between said upper and said lower areas;

(d) forming barrel means from a plurality of ring-like members disposed adjacent one another so that their respective rings are concentric and with such ring-like members secured together to receive the shaft for operating the swing jaw, and with an outer perhipheral surface disposed proximate said first plate member proximate said first plate member proximate said upper area thereof and disposed proximate at least some of said rib members proximate an upper location thereof; and (e) securing said first plate member, said plurality of rib member, and said barrel member together to form the swing jaw.

5. A composite swing jaw for a crusher; comprising:

(a) a first plate member having an upper area and a lower area with a face surface and a rear surface extending therebetween;

(b) a plurality of main rib members positioned and disposed to extend outwardly from said rear surface of said first plate member and sized to extend between an upper location proximate said upper area and a lower location proximate said lower area;

(c) fabricated barrel means, formed from plate material into a barrel configuration with an opening through which the shaft for operating the swing jaw passes, having an outer peripheral surface disposed in proximity to said first plate member proximate said upper area thereof and to said main rib members proximate said upper location; and (d) said first plate member, said plurality of main rib members, and said barrel means being secured by weldments into a composite whole.

6. A composite swing jaw for a crusher; comprising:

(a) a first plate member having an upper area and a lower area with a face surface and a rear surface extending therebetween;

(b) a plurality of main rib members positioned and disposed to extend outwardly from said rear surface of said first plate member and sized to extend between an upper location proximate said upper area and a lower location proximate said lower area;

(c) barrel means, formed from a plate of material rolled into a substantially cylindrical configuration and welded together with an opening through which the shaft for operating the swing jaw passes, having an outer peripheral surface disposed in proximity to said first plate member proximate said upper area thereof and to said main rib members proximate said upper location; and (d) said first plate member, said plurality of main rib members, and said barrel means being secured by weldments into a composite whole.

7. The swing jaw of claim 1, including a plurality of support plates secured within said barrel like enclosure to strengthen same.

8. The swing jaw of claim 1, wherein said securing means comprises a plurality of welds securing said plurality of main ribs to said first plate member, and said barrel means to said first plate member.

9. The swing jaw of claim 2, wherein:

(a) a first one of said main rib members is sized to extend adjacent one side of said barrel means and has formed therein an aperture sized to conform to and so as to be in alignment with the apertures in said ring-like members; and (b) a second one of said main rib members is sized to extend adjacent the otherside of said barrel means and has formed therein an aperture sized to conform to and so as to be in alignment with, the apertures in said ring-like members.

10. The swing jaw of claim 9 including a plurality of support ribs disposed between said main ribs and welded thereto.

11. The swing jaw of claim 10, wherein said main rib members are disposed inwardly of respective edges of said first plate member.

12. The swing jaw of claim 11, including external cross bracing members welded to said first plate member and said main rib members proximate said edges of said first plate member.

13. The swing jaw of claim 1, including a first impact plate secured to said first plate member proximate said upper area and a second impact plate secured to said first impact plate and to at least one of said plurality of plate members forming said barrel like enclosure to assist in so forming said barrel like enclosure.

14. The swing jaw of claim 5, including:

(a) a second plate member positioned and disposed adjacent at least some of said plurality of main rib members to sandwich the main rib members so disposed between a predetermined surface of said second plate member and said first plate member;

(b) said second plate member extending from proximate said upper location to a position proximate said lower location; and (c) additional weldments for rigidly interconnecting said second plate members and some of said plurality of main rib members.

15. The swing jaw of claim 5 including:

(a) a first impact plate secured to said first plate member proximate said upper area; and (b) a second impact plate secured to said first impact plate;

(c) said first impact plate and said second impact plate being disposed proximate said barrel means to protect same from material to be crushed when deposited in the crusher.

16. The swing jaw of claim 5 including a toggle plate seat support member secured proximate said lower location, said toggle plate seat support being formed from bar stock of circular cross-sectional configuration and into which is formed a groove of pre-determined size and configuration to receive a toggle seat.

17. The swing jaw of claim 1, including a toggle plate seat support member secured proximate said lower location; said toggle plate seat support member being formed from bar stock of circular cross-sectional configuration and into which is formed a groove of predetermined size and configuration to receive a toggle seat.

18. The swing jaw of claim 1, including:

(a) a second plate member positioned and disposed adjacent at least some of said plurality of main rib members to sandwich the main rib members so disposed between a predetermined surface of said second plate member and said first plate member;

(b) said second plate member extending from proximate said upper location to a position proximate said lower location; and (c) additional securing means for rigidly interconnecting said second plate members and some of said plurality of main rib members.

19. The swing jaw of claim 18, wherein:

(a) said main rib members include a centrally disposed main rib member; and (b) said second plate member includes a plurality of spaced holes extending therethrough and aligned with said centrally disposed main rib member;

(c) said second plate member being secured to said centrally disposed main rib member by welding side surfaces of said holes to the adjacent area of said main rib members.

20. The swing jaw of claim 18, wherein said second plate member is of first predetermined side to side dimension proximate said upper location and of a second predetermined side to side dimension proximate said lower location; said second predetermined side to side dimension is greater than said first predetermined side to side dimension; and a toggle plate seat support member secured proximate said lower location and being of a side to side extent which proximates said second predetermined side to side dimension.

21. The swing jaw of claim 6, including a toggle plate seat support member secured proximate said lower location; said toggle plate seat support member being formed from bar stock of circular cross-sectional configuration and into which is formed a groove of predetermined size and configuration to receive a toggle seat.

22. The swing jaw of claim 6, including:

(a) a second plate member positioned and disposed adjacent at least some of said plurality of main rib members to sandwich the main rib members so disposed between a predetermined surface of said second plate member and said first plate member;

(b) said second plate member extending from proximate said upper location to a position proximate said lower location; and (c) additional securing means for rigidly interconnecting said second plate members and some of said plurality of main rib members.

23. The swing jaw of claim 22, wherein:

(a) said main rib members include a centrally disposed main rib member; and (b) said second plate member includes a plurality of spaced holes extending therethrough and aligned with said centrally disposed main rib members;

(c) said second plate member being secured to said centrally disposed main rib member by welding side surfaces of said holes to the adjacent area of said main rib members.

24. The swing jaw of claim 22, wherein said second plate member is of a first predetermined side to side dimension proximate said upper location and of a second predetermined side to side dimension proximate said lower location; said second predetermined side to side dimension is greater than said first predetermined side to side dimension; and a toggle plate seat support member secured proximate said lower location and being of a side to side extent which proximates said second predetermined side to side dimension.

25. The swing jaw of claim 2, wherein said securing means comprises a plurality of welds securing said plurality of main ribs to said first plate member, and said barrel means to said first plate member.

26. The swing jaw of claim 2, including a toggle plate seat support member secured proximate said lower location; said toggle plate seat support member is formed from bar stock of circular cross-sectional configuration and into which is formed a groove of predetermined size and configuration to receive a toggle seat.

27. The swing jaw of claim 2, including:

(a) a second plate member positioned and disposed adjacent at least some of said plurality of main rib members to sandwich the main rib members so disposed between a predetermined surface of said second plate member and said first plate member;

(b) said second plate member extending from proximate said upper location to a position proximate said lower location; and (c) additional securing means for rigidly interconnecting said second plate members and some of said plurality of main rib members.

28. The swing jaw of claim 27, wherein:

(a) said main rib members include a centrally disposed main rib member; and (b) said second plate member includes a plurality of spaced holes extending therethrough and aligned with said centrally disposed main rib member;

(c) said second plate member being secured to said centrally disposed main rib member by welding side surfaces of said holes to the adjacent area of said main rib members.

29. The method of forming a crusher swing jaw; comprising:

(a) forming a first plate member with an upper area and a lower area and with a face surface and a rear surface extending therebetween, and with a pair of side edges;

(b) forming a plurality of rib members from plate-like material and sized to correspond to the distance between said upper and lower areas;

(c) positioning said plurality of rib-like members so that each one extends outwardly from said rear surface and between said upper and lower areas;

(d) fabricating barrel means from plate material formed into a barrel-like configuration to receive the shaft for operating the swing jaw, and with an outer peripheral surface disposed proximate said first plate member proximate said upper area thereof and disposed proximate at least some of said rib members proximate an upper location thereof; and (e) securing said first plate member, said plurality of rib members, and said barrel member together by a plurality of weldments to form the swing jaw.

30. The method of forming a crusher swing jaw; comprising:

(a) forming a first plate member with an upper area and a lower area and with a face surface and a rear surface extending therebetween, and with a pair of side edges;

(b) forming a plurality of rib members from plate-like material and sized to correspond to the distance between said upper and lower areas;

(c) positioning said plurality of rib-like members so that each one extends outwardly from said rear surface and between said upper and said lower areas;

(d) forming barrel means from plate stock rolled and welded into cylindrical configuration and to receive the shaft for operating the swing jaw, and with an outer peripheral surface disposed proximate said first plate member proximate said upper area thereof and disposed proximate at least some of said rib members proximate an upper location thereof; and (e) securing said first plate member, said plurality of rib members, and said barrel member together by a plurality of weldments to form the swing jaw.

31. The method of claim 30, including:

(a) forming a toggle seat support member from bar stock of circular cross-sectional configuration;

(b) securing said toggle seat support member in place proximate said lower area; and (c) forming a toggle seat groove in a predetermined surface of said toggle seat support member.

32. The method of claim 3, including forming a part of said barrel by including a portion of said upper area of said first plate member in said barrel means.

33. The method of claim 30, wherein said cylindrical configuration is open ended.

34. The method of claim 4, wherein said ring-like members are secured by welding.

35. The method of claim 29, including:

(a) forming a second plate member; and (b) securing said second plate member to said rib members so as to sandwich said rib members between said first and said second plate members.

36. The method of claim 35, wherein said second plate member is formed with a side to side dimension at an end thereof proximate said toggle seat member that is wider than the side to side dimension of said second plate member at its opposite end.

* * * * *